US012252253B2

(12) United States Patent
Day et al.

(10) Patent No.: US 12,252,253 B2
(45) Date of Patent: Mar. 18, 2025

(54) AIRCRAFT SEAT WITH NESTED ENERGY ATTENUATION GUIDE SYSTEM

(71) Applicant: AMI Industries, Inc., Colorado Springs, CO (US)

(72) Inventors: Martin S. Day, Colorado Springs, CO (US); Chad Pacheco, Colorado Springs, CO (US); Douglas Foisie, Colorado Springs, CO (US)

(73) Assignee: AMI Industries, Inc., Colorado Springs, CO (US)

(*) Notice: Subject to any disclaimer, the term of this patent is extended or adjusted under 35 U.S.C. 154(b) by 76 days.

(21) Appl. No.: 17/966,413

(22) Filed: Oct. 14, 2022

(65) Prior Publication Data

US 2024/0124141 A1  Apr. 18, 2024

(51) Int. Cl.
*B64D 11/06* (2006.01)
*B64D 25/04* (2006.01)
*B64D 25/115* (2006.01)

(52) U.S. Cl.
CPC ...... *B64D 11/0619* (2014.12); *B64D 11/0698* (2014.12); *B64D 25/04* (2013.01)

(58) Field of Classification Search
CPC .. B64D 11/0619; B64D 11/0698; B64D 25/04
See application file for complete search history.

(56) References Cited

U.S. PATENT DOCUMENTS

| 3,059,966 A | * | 10/1962 | Spielman | B60N 2/7082 188/374 |
| 3,532,379 A | * | 10/1970 | Gonsalves, Jr. | B60N 2/509 297/307 |
| 3,985,388 A | | 10/1976 | Hogan | |
| 4,128,217 A | * | 12/1978 | Mazelsky | B64D 25/04 297/216.16 |
| 4,150,805 A | * | 4/1979 | Mazelsky | B64D 25/04 297/216.1 |

(Continued)

FOREIGN PATENT DOCUMENTS

| CN | 110341563 A | 10/2019 |
| CN | 112141344 A | 12/2020 |

(Continued)

OTHER PUBLICATIONS

European Search Report dated Feb. 16, 2024; European Application No. 23202813.4.

(Continued)

*Primary Examiner* — Rodney B White
(74) *Attorney, Agent, or Firm* — Suiter Swantz IP

(57) ABSTRACT

An aircraft seat assembly including stanchions defining elongated guide channels and elongated motion sleds nested in the guide channels and affixed to a seat bucket. An energy absorber implemented as a wire bender assembly is coupled between the stanchions and the motion sled. In use, the elongated guide channels guide motion of the motion sleds and the wire bender assemblies attenuate energy during a dynamic event exceeding a predetermined threshold load value. The elongated interface between the guide channels and motion sleds serve to transfer excessive loading to the seat frame thereby protecting the seat assembly from damage and the occupant from excessive lumbar spinal loads.

20 Claims, 10 Drawing Sheets

(56) References Cited

U.S. PATENT DOCUMENTS

| | | | | |
|---|---|---|---|---|
| 4,358,154 A * | 11/1982 | Campbell | B60N 2/4242 | 188/372 |
| 4,408,738 A * | 10/1983 | Mazelsky | B64D 25/04 | 280/808 |
| 4,423,848 A * | 1/1984 | Mazelsky | B64D 25/04 | 297/216.16 |
| 4,523,730 A * | 6/1985 | Martin | B64D 25/04 | 297/216.13 |
| 4,525,010 A * | 6/1985 | Trickey | B64D 25/04 | 297/308 |
| 4,655,416 A * | 4/1987 | Carnell | B64D 11/00 | 244/234 |
| 5,273,240 A | 12/1993 | Sharon | | |
| 5,324,095 A * | 6/1994 | Yamauchi | B60N 2/544 | 297/216.16 |
| 5,558,301 A * | 9/1996 | Kerdoncuff | B60N 2/4242 | 244/118.6 |
| 5,676,336 A * | 10/1997 | Nefy | B64D 25/04 | 244/118.6 |
| 5,692,705 A * | 12/1997 | Bellais | B64D 11/0619 | 244/122 R |
| 5,699,984 A * | 12/1997 | Pinault | B64D 11/064 | 188/371 |
| 6,152,401 A | 11/2000 | Green | | |
| 6,237,889 B1 * | 5/2001 | Bischoff | B60N 2/504 | 180/902 |
| 6,378,939 B1 * | 4/2002 | Knoll | B64D 11/0619 | 188/374 |
| 6,394,393 B1 * | 5/2002 | Mort | B64D 11/06 | 297/216.17 |
| 6,446,910 B1 * | 9/2002 | Knoll | B64D 11/0689 | 280/801.1 |
| 6,585,190 B2 | 7/2003 | Mort | | |
| 6,820,931 B2 | 11/2004 | Ruff et al. | | |
| 7,445,181 B2 * | 11/2008 | Knoll | B64D 11/0691 | 297/216.17 |
| 7,484,799 B2 * | 2/2009 | Meyer | B60N 2/525 | 297/216.17 |
| 7,744,155 B2 * | 6/2010 | List | B60N 2/42736 | 297/216.17 |
| 8,002,348 B2 * | 8/2011 | Jessup | B60N 2/24 | 297/216.13 |
| 8,091,964 B2 * | 1/2012 | Carter | B60N 2/42736 | 297/284.3 |
| 8,342,300 B2 * | 1/2013 | Guillon | B64D 11/0619 | 188/313 |
| 8,408,643 B2 | 4/2013 | Honnorat | | |
| 8,469,400 B2 * | 6/2013 | Merrill | B60N 2/24 | 297/480 |
| 8,678,465 B1 * | 3/2014 | Aragon | B60N 2/0722 | 296/68.1 |
| 8,888,161 B1 | 11/2014 | Aragon et al. | | |
| 8,888,179 B1 | 11/2014 | Bosen et al. | | |
| 8,911,013 B2 * | 12/2014 | Reinck | B60N 2/24 | 297/484 |
| 8,939,502 B2 * | 1/2015 | Grant | B60R 21/12 | 297/216.16 |
| 8,991,569 B1 * | 3/2015 | Lou | F16F 13/007 | 188/266.5 |
| 9,033,412 B2 * | 5/2015 | Reinck | B64D 25/04 | 296/68.1 |
| 9,132,753 B1 | 9/2015 | Campbell | | |
| 9,308,999 B2 * | 4/2016 | Joffre | B64D 11/0619 | |
| 9,494,390 B2 * | 11/2016 | Berman | B60N 2/522 | |
| 9,604,725 B2 | 3/2017 | Cecinas et al. | | |
| 9,709,121 B2 | 7/2017 | Purushothaman et al. | | |
| 9,797,692 B2 * | 10/2017 | Berman | B60N 2/509 | |
| 9,969,307 B1 * | 5/2018 | Bosen | B64D 11/0619 | |
| 10,052,984 B2 * | 8/2018 | Bosen | B60N 2/42736 | |
| 10,166,889 B1 * | 1/2019 | Lou | B60N 2/4242 | |
| 10,480,908 B2 * | 11/2019 | Huang | B60N 2/42709 | |
| 10,612,616 B1 * | 4/2020 | Lou | F16F 7/123 | |
| 11,066,172 B2 | 7/2021 | Bolukbasi et al. | | |
| 11,858,386 B2 * | 1/2024 | Tsiaras | B60N 2/50 | |
| 11,945,590 B1 * | 4/2024 | Pacheco | B60N 2/42709 | |
| 11,987,363 B2 * | 5/2024 | Zhou | B64D 11/062 | |
| 12,049,321 B2 * | 7/2024 | Pacheco | B64D 25/04 | |
| 2005/0264082 A1 * | 12/2005 | Kumpf | F41H 7/046 | 297/452.1 |
| 2010/0207433 A1 * | 8/2010 | Hahn | B60N 2/24 | 297/216.1 |
| 2015/0367754 A1 | 12/2015 | Walter et al. | | |
| 2017/0282755 A1 | 10/2017 | Gordiet et al. | | |

FOREIGN PATENT DOCUMENTS

| | | |
|---|---|---|
| CN | 113562179 A | 10/2021 |
| DE | 2855406 A1 | 6/1979 |
| EP | 3183171 A1 | 6/2017 |
| GB | 998535 A | 7/1965 |
| WO | 2021165324 A1 | 8/2021 |

OTHER PUBLICATIONS

European Search Report dated Mar. 11, 2024; European Application No. 23202488.5.

* cited by examiner

AIRCRAFT SEAT WITH NESTED ENERGY ATTENUATION GUIDE SYSTEM

TECHNICAL FIELD AND BACKGROUND

The present disclosure relates generally to energy attenuating aircraft seats, and more particularly to an energy attenuation system including a nested tongue-and-groove style fitment of two long, thin-walled, tolerance controlled, extruded parts.

Military aircraft including rotorcraft and helicopters may undergo high vertical accelerations and decelerations in fast (e.g., hard) landing scenarios. To help preserve health and safety of the occupants, seats in such aircraft are typically equipped with energy attenuation systems designed to absorb these high vertical accelerations and decelerations. During normal use of the seat, these systems remain inactive thereby maintaining component relative positions. When activated, these systems allow relative motion between components to distribute seat loads, for example, by way of plastic deformation of a deformable element.

Current energy absorption systems utilize small, machined parts that act alone on a relatively localized area of the seat and over a small load transfer zone. As such, current systems are expensive to implement, require precise fabrication, and in some cases are not efficient at evenly distributing seat loads.

Therefore, what is needed is an energy absorber solution that overcomes the disadvantages of prior art systems.

BRIEF SUMMARY

In one aspect, the present disclosure provides an aircraft seat assembly including a stanchion forming an elongated guide channel, an elongated motion sled nested in the elongated guide channel, a seat bucket coupled to the elongated motion sled, and an energy absorber coupled between the stanchion and the elongated motion sled. In use, the energy absorber is configured to control motion of the elongated motion sled relative to the stanchion as the elongated motion sled strokes relative to the stanchion when a load on the seat bucket (e.g., corresponding to a lumbar spinal load) exceeds a predetermined threshold value.

In some embodiments, the assembly further includes a low friction material positioned at an interface between the elongated motion sled and the stanchion, the low friction material facilitating sliding motion between the elongated motion sled and the stanchion, and the low friction material having a coefficient of friction lower than each of the movable component and the stationary component.

In some embodiments, the energy absorber is implemented as a wire bender assembly including a plurality of rollers affixed to the stanchion and positioned in the elongated guide channel, and a wire affixed to the elongated motion sled and engaging the plurality of rollers. When the load value exceeds the predetermined threshold load value, movement of the elongated motion sled relative to the stanchion causes the wire to be pulled through the plurality of rollers thereby deforming the wire by bending the wire thereby attenuating energy.

In some embodiments, the wire increases in cross section in a direction of the top end of the wire that resistance to deformation increases with continued motion of the elongated motion sled relative to the stanchion.

In some embodiments, the guide channel has a C-shaped cross section opening in a first direction and the elongated motion sled has a C-shaped cross section opening in a second direction opposite the first direction.

In some embodiments, each of the stanchion and the elongated motion sled is manufactured according to a extrusion process.

In some embodiments, the seat bucket attaches to the elongated motion sled at three or more separate attachment points positioned along a length of the elongated motion sled.

In some embodiments, the seat assembly includes two stanchions symmetrically arranged, each of the two stanchions defining an elongated guide channel having an elongated motion sled positioned therein and an energy absorber, wherein the seat bucket is substantially centered between the stanchions and is coupled to the two elongated motion sleds in a symmetrical arrangement.

In some embodiments, the stanchion and the elongated motion sled overlap a length of at least 24 inches.

In another aspect, the present disclosure provides an energy absorption system including a stationary component defining an elongated guide channel, a movable component nested in the elongated guide channel, and an energy absorber coupled between the stationary component and the movable component, the energy absorber configured to control motion of the movable component relative to the stationary component as the movable component strokes relative to the stationary component when a load on the movable component exceeds a predetermined threshold load value, wherein each of the stationary component and the movable component are extruded parts.

In some embodiments, the assembly includes a low friction material positioned at an interface between the movable component and the stationary component, the low friction material having a coefficient of friction lower than each of the movable component and the stationary component.

In some embodiments, the energy absorber is a wire bender assembly including a plurality of rollers affixed to the stationary component and positioned in the elongated guide channel, and a wire affixed to the movable component and engaging the plurality of rollers, wherein, when a load acting on the movable component exceeds the predetermined threshold load value, movement of the movable component relative to the stationary component causes the wire to be pulled through the plurality of rollers thereby deforming the wire by bending the wire thereby attenuating energy.

This brief summary is provided solely as an introduction to subject matter that is fully described in the detailed description and drawings. This brief summary should not be considered to describe essential features nor be used to determine the scope of the claims. Moreover, it is to be understood that both the foregoing brief summary and the following detailed description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
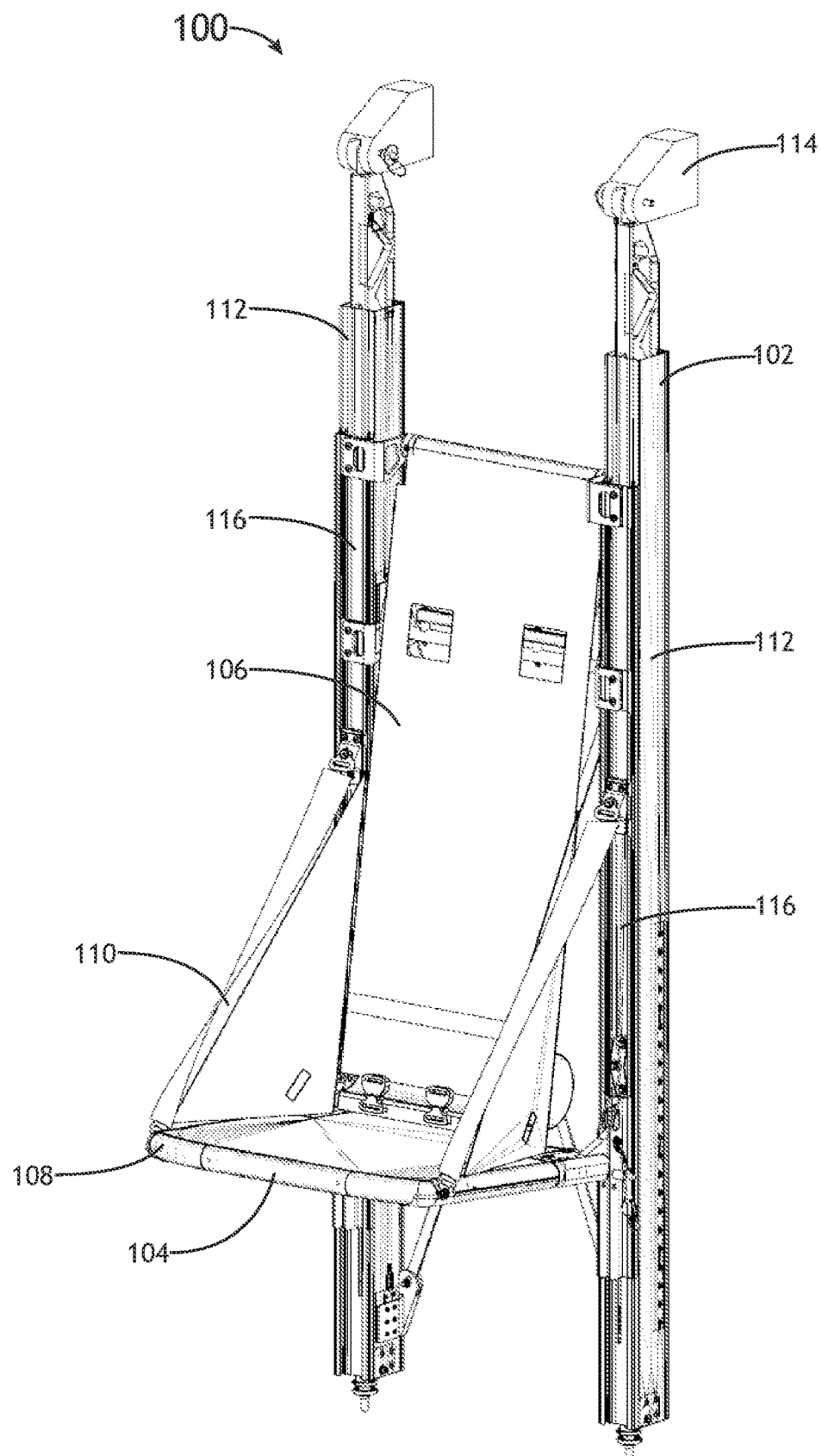
FIG. 1A-1D are various isometric, front and side views of an aircraft seat assembly in accordance with an embodiment of this disclosure.
Figure 1B:
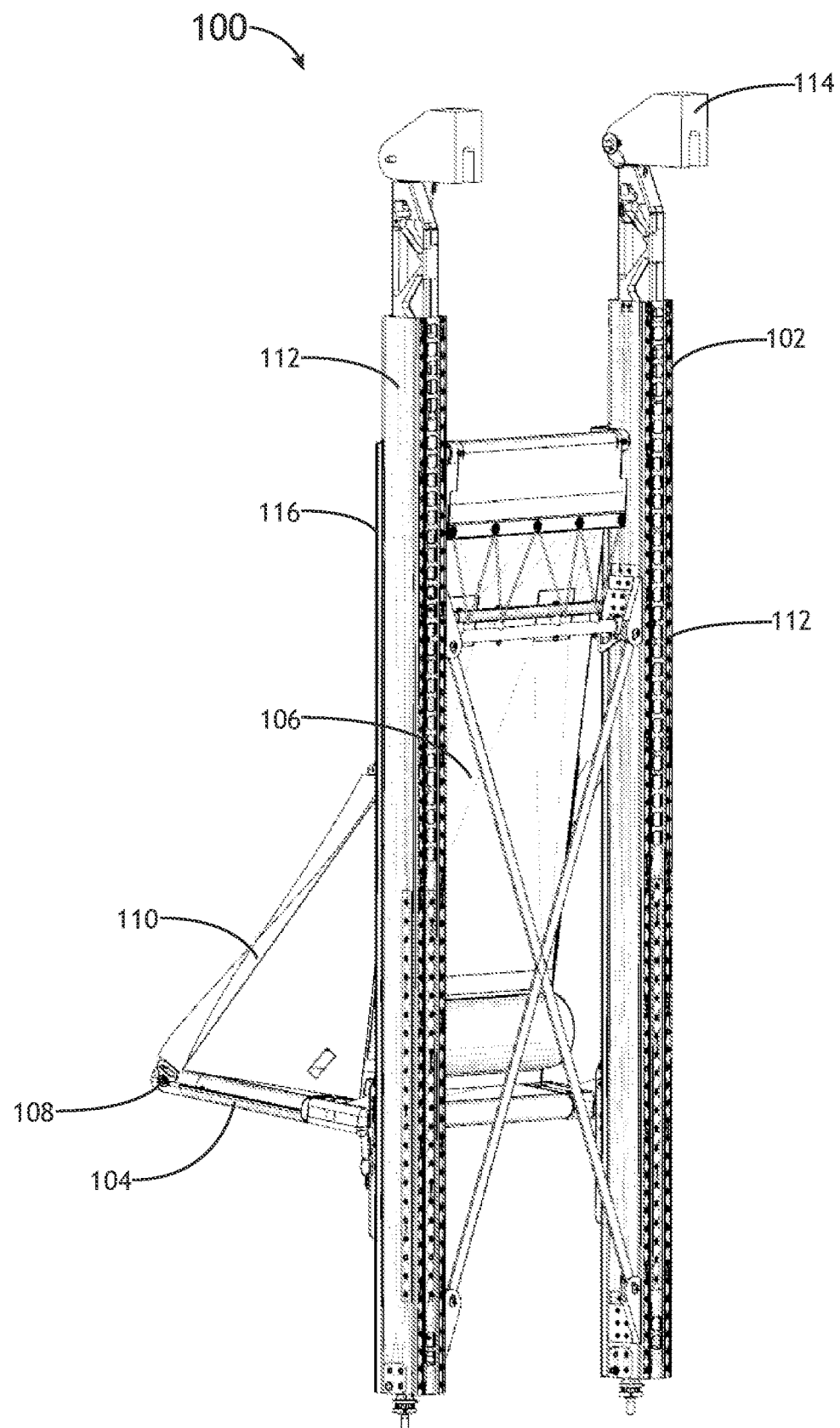
Figure 1C:
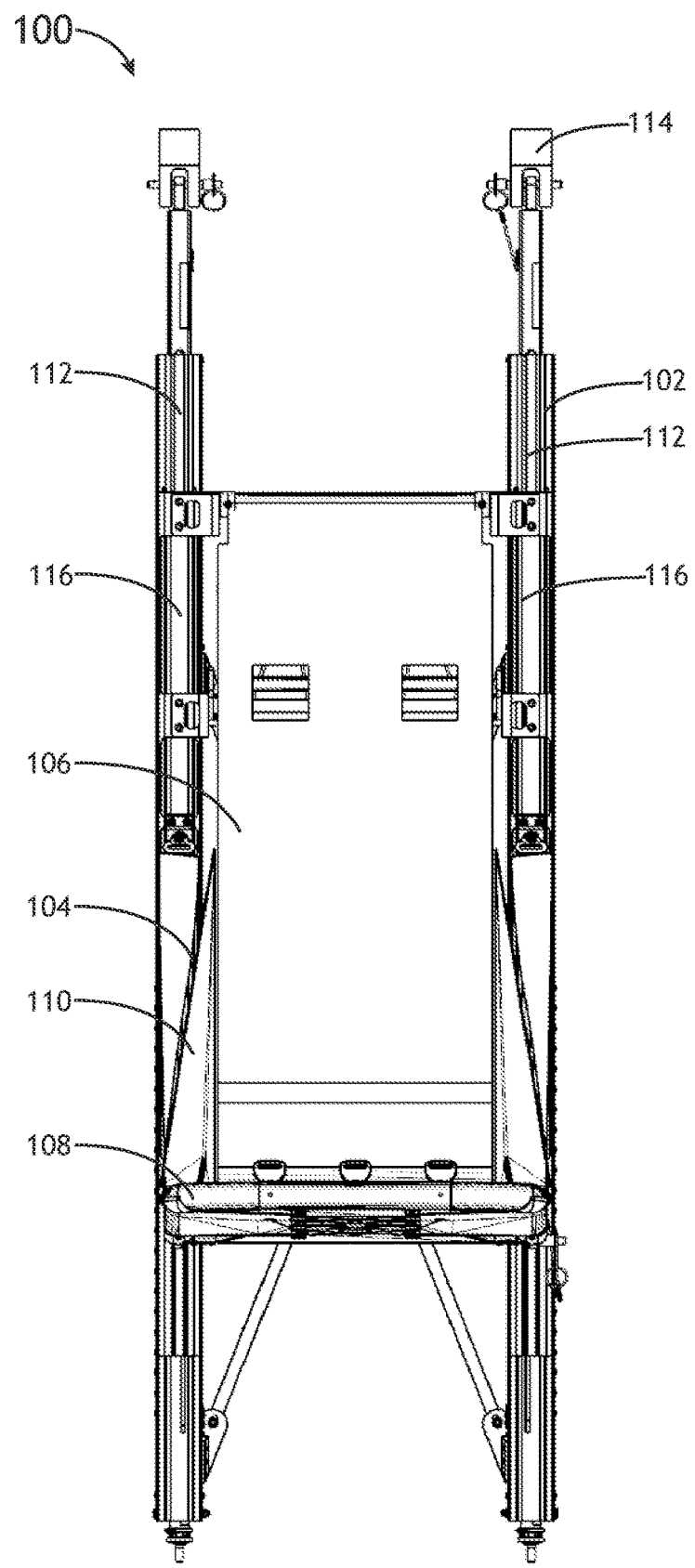
Figure 1D:
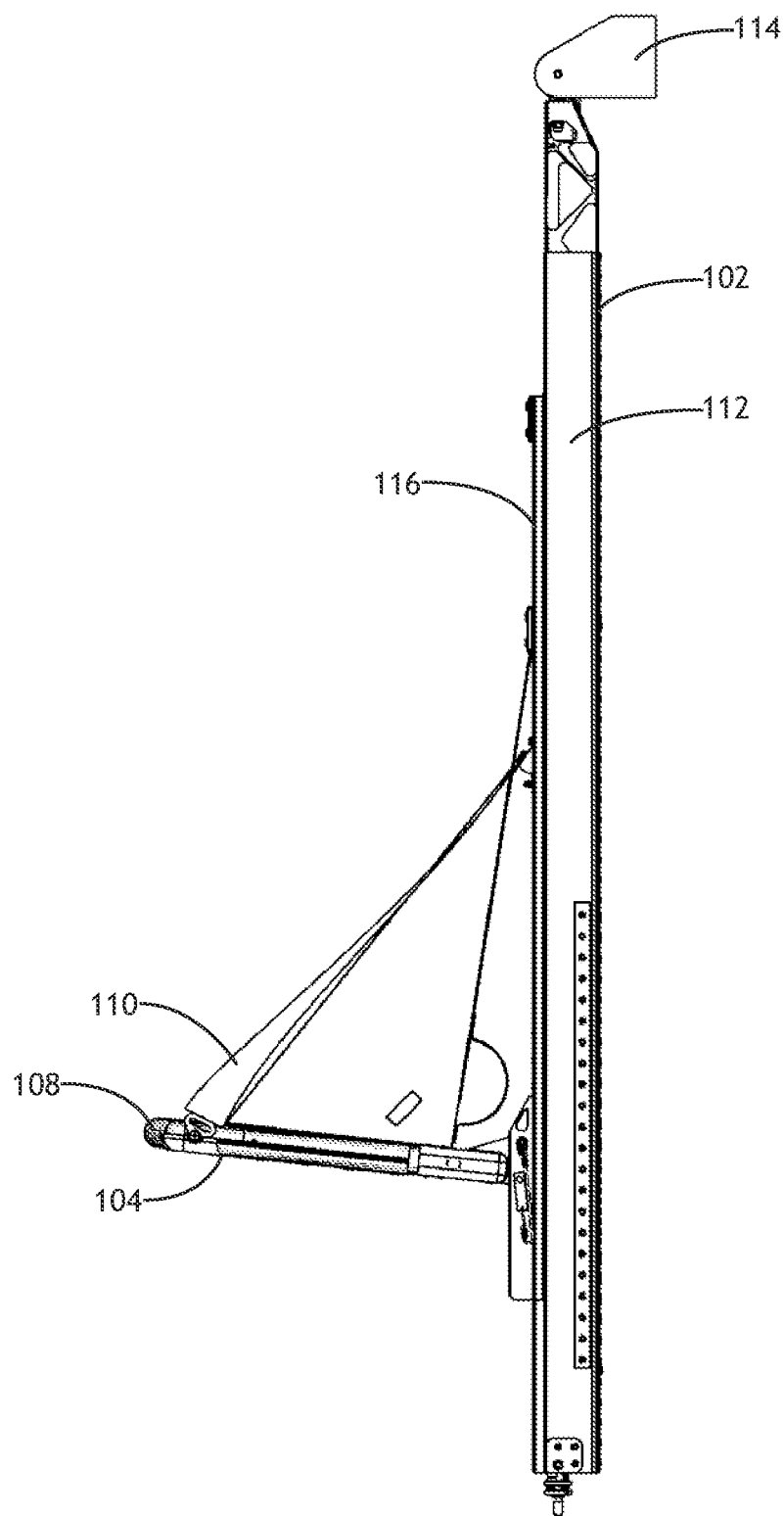

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides a seat assembly for an aircraft such as a rotorcraft. Aspects of the seat assembly disclosed herein are applicable to various aircraft seat types including, but not limited to, pilot seats, copilot seats, jump seats, crew seats, and passenger seats, as well as seats used on conveyances other than aircraft. The seat assembly generally includes a seat bucket coupled to at least one movable component, and preferably coupled to two movable components in a symmetrical configuration. In embodiments, the seat bucket position is fixed relative to the movable components, and in some cases positionally fixed with the exception of vertical adjustment. The movable components are coupled to stationary components. During normal use (i.e., standard use of the seat in the absence of a dynamic event), relative motion between the movable component and the fixed component is prevented. During a dynamic event (i.e., emergency condition), the movable component moves relative to the stationary component and the energy absorber acts to attenuate energy via deformation such as plastic deformation to control the seat motion to protect the occupant, for example protect the spine. In some embodiments, the motion path of the movable component is linear.

FIGS. 1A-1D illustrate an aircraft seat assembly 100 in accordance with an embodiment of the present disclosure. The seat assembly 100 generally includes a seat frame 102 supporting a seat bucket 104. In some embodiments, the seat bucket 104 includes a seat back 106 and a seat pan 108 pivotally attached to the seat back 106. Straps 110 may span between the detached edge of the seat pan 108 and the seat back 106, or the seat frame 102, to stabilize and limit rotational motion of the seat pan 108. In use, the seat pan 108 may fold upward against the seat back 106 for compact stowage of the seat bucket 104. Although not shown, the seat bucket 104 may be equipped with a passenger restraint.

The seat frame 102 generally includes at least one stanchion 112, and preferably a pair of spaced stanchions 112 in a symmetrical arrangement with the seat bucket 104 centered relative thereto. Each stanchion 112 may be elongated and may be coupled to upper and lower frame members including attachments 114 that function to attach the assembly to the aircraft. In some embodiments, each stanchion 112 is an elongated, thin-walled part formed according to an extrusion process. The seat bucket 104 attaches to at least one motion sled 116, and preferably a pair of motion sleds 116 in a symmetrical arrangement. The motion sleds 116 are slidably disposed in guide channels formed in the stanchions 112 as discussed further below. In embodiments, each stanchion 112 may be stationary and the motion sleds 116 are movable relative to the stanchions 112 during a dynamic event.

During a dynamic event in which a load value exceeds a predetermined threshold load value, the motion sleds 116 are configured to stoke relative to the stanchions 112 along a predetermined motion path. In embodiments, a threshold load value/range may be a lumbar spine load on the occupant as monitored during a dynamic test using an instrumented and anthropomorphically representative test dummy. As such, the load value may change depending on the size percentile of the occupant and also can vary between FAA/EASA certified aircraft requirements and non-FAA/EASA qualified aircraft requirements (e.g., military).

In some embodiments, the predetermined motion path is linear and vertical or substantially vertical. In other embodiments, the motion path may include a combination of linear and rotational motions. The term "dynamic event" as used herein refers to an event, such as a deceleration or acceleration, of sufficient threshold magnitude to activate the energy absorber system of the seat assembly 100 (e.g., a 12G event, a 16G event, etc.). During normal use of the seat assembly 100 (i.e., below the predetermined threshold value), the positions of the motion sleds 116 relative to the stanchions 112 are maintained. During the dynamic event and responsive to exceeding the predetermined threshold load value, the energy absorbers act to attenuate energy as the motion sleds 116 stroke relative to the stanchions 112. In some embodiments, the full range of motion of the motion sleds 116 may range from about 6 inches to about 12 inches depending on the height of the seat bucket 104 relative to the floor.

Figure 2:
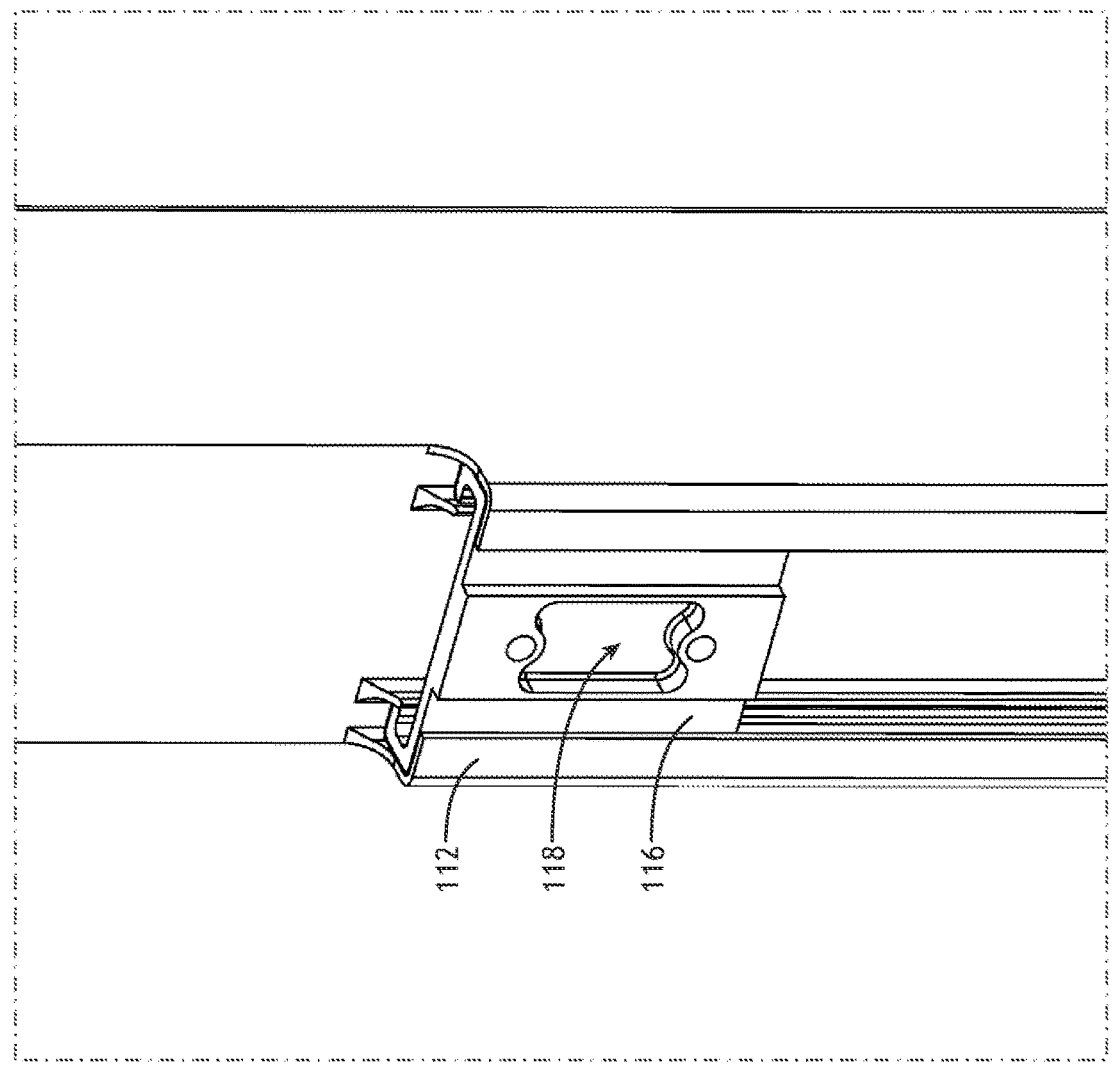
FIG. 2 is a detailed view of a seat bucket attachment of the aircraft seat assembly in accordance with an embodiment of this disclosure.

In some embodiments, the seat bucket 104 attaches to the motion sled 116 at multiple locations, for instance a top attachment location and a bottom attachment location. In some embodiments, each seat bucket 104 and motion sled 116 coupling includes at least three attachments locations, for instance an upper location, a lower location, and a middle location positioned between the upper and lower locations. FIG. 2 illustrates a non-limiting example of an attachment location 118 formed on the motion sled 116 for attaching the seat bucket, directly or indirectly. FIG. 2 further illustrates the nested configuration of the motion sled 116 and stanchion 112 as discussed in detail below.

Figure 3:
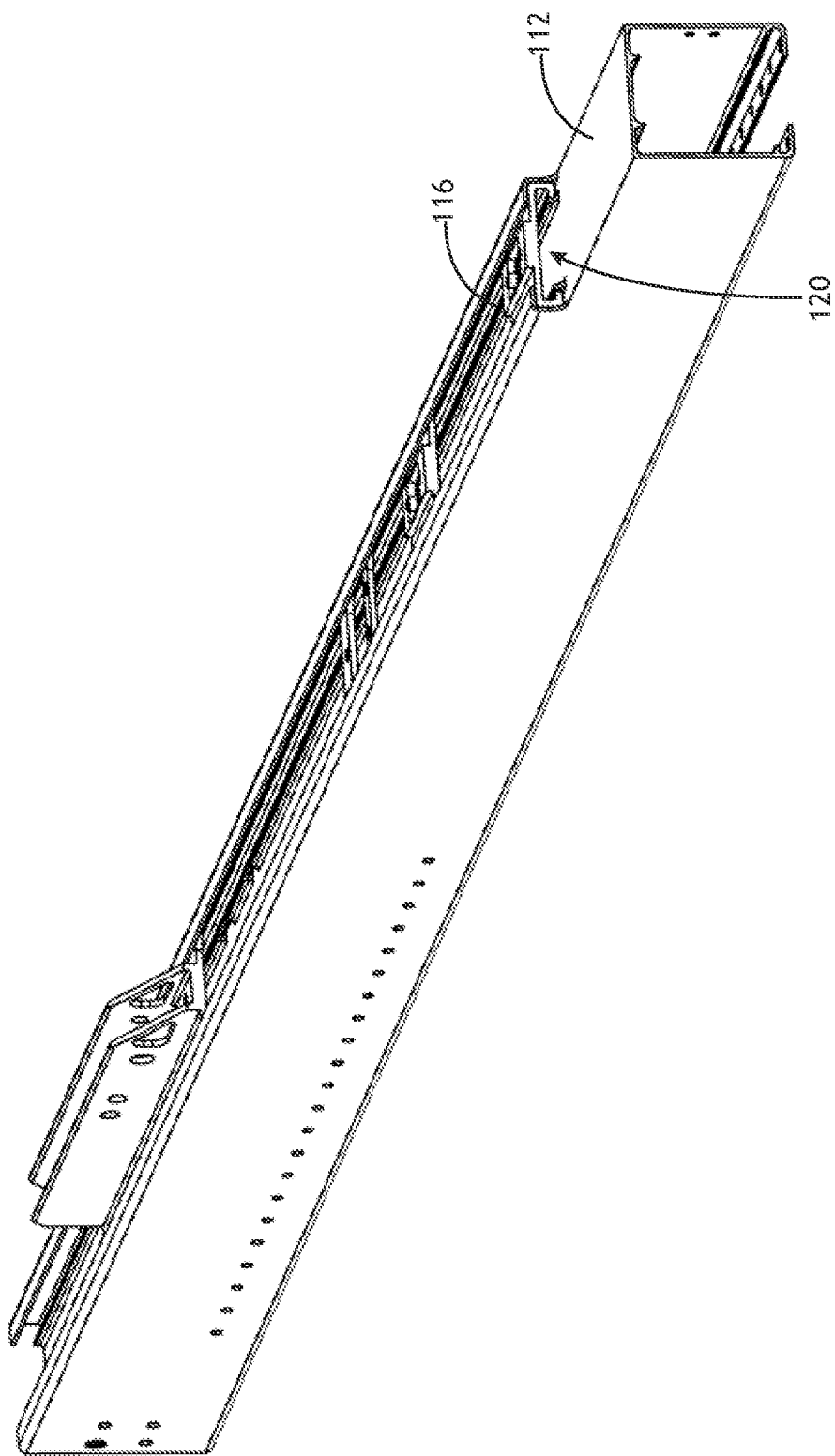
FIG. 3 is an isometric view of a stanchion and motion sled assembly in accordance with an embodiment of this disclosure.

FIG. 3 illustrates a stanchion assembly including a stanchion 112 and motion sled 116. The stanchion defines an elongated guide channel 120 and the motion sled 116 is slidably disposed in the guide channel 120. Each of the stanchion 112, motion sled 116 and guide channel 120 are elongated such that the motion sled 116 and stanchion 112 longitudinally overlap a length from about 6 inches to about 36 inches, more preferably from about 12 inches to about 24 inches. As such, in contrast to the localized action of conventional energy attenuation systems, the comparatively large contact area between the motion sled 116 and stanchion 112 functions to evenly distribute load on the seat bucket from the motion sled 116 to the stanchion 112 forming part of the seat frame. In some embodiments, the energy absorber and nested configuration of the components work together to facilitate stroking while controlling the seat bucket motion.

Figure 4:
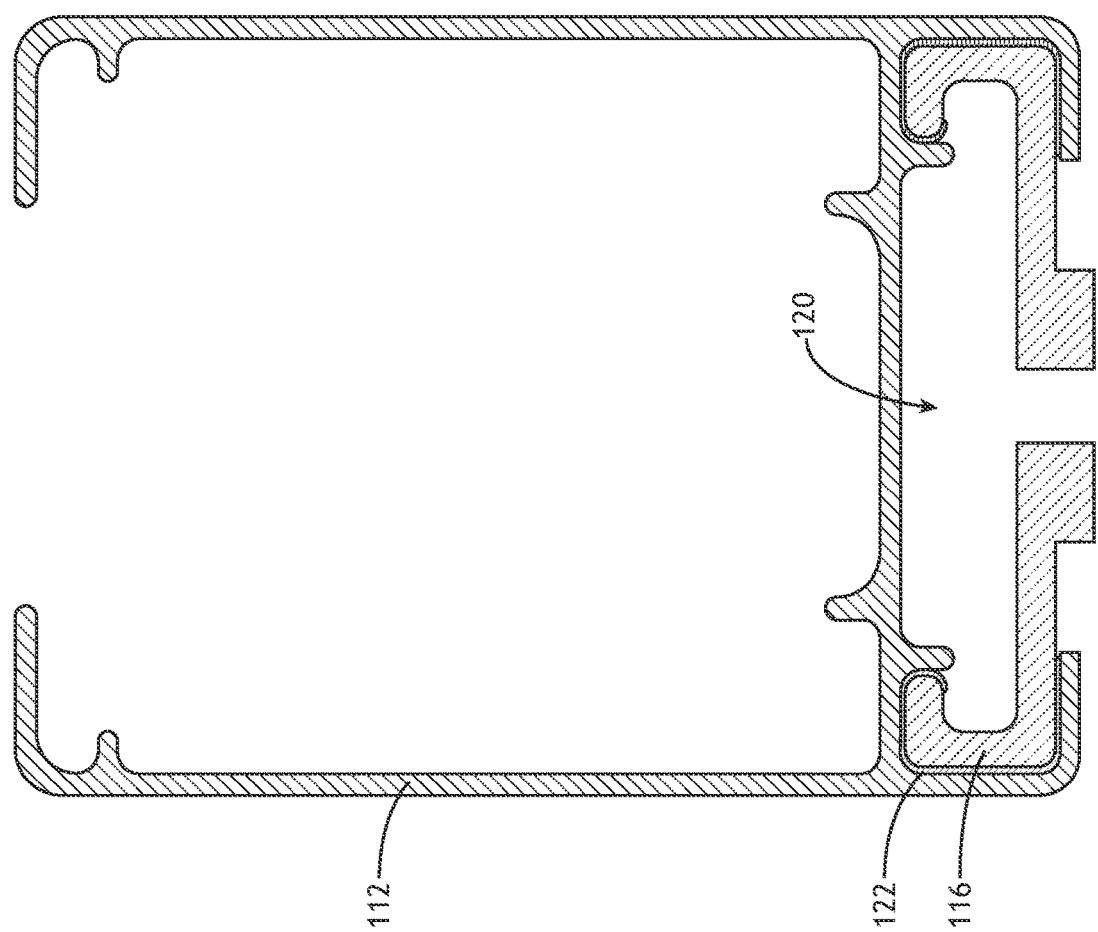
FIG. 4 is a cross section of the stanchion and motion sled assembly of FIG. 3 showing the component relative positions.

FIG. 4 illustrates the shape and nested configuration of the stanchion 112 and motion sled 116 according to an exemplary embodiment. The motion sled 116 is received in the elongated guide channel 120 formed in the stanchion 112. In some embodiments, the portion of the stanchion 112 forming the guide channel 120 is substantially C-shaped and opens in a first direction, and the motion sled 116 is also substantially C-shaped and opens in a second direction facing the first direction to provide multiple contact surfaces between the motion sled 116 and the stanchion 112. In some embodiments, a low friction material 122 (i.e., lower coefficient of friction as compared to at least one of the motion sled 116 and the stanchion 112) is positioned at the interface between the motion sled 116 and the stanchion 112 to facilitate smooth stroking of the motion sled 116. The low friction material 122 may be a separate layer or coating applied to one of the motion sled 116 and the stanchion 112.

Figure 5:
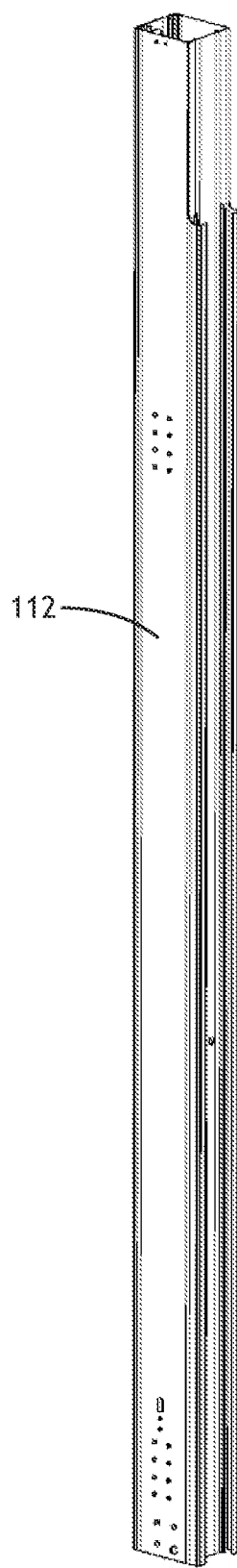
FIG. 5 is an isometric view of a stanchion in accordance with an embodiment of this disclosure.
Figure 6:
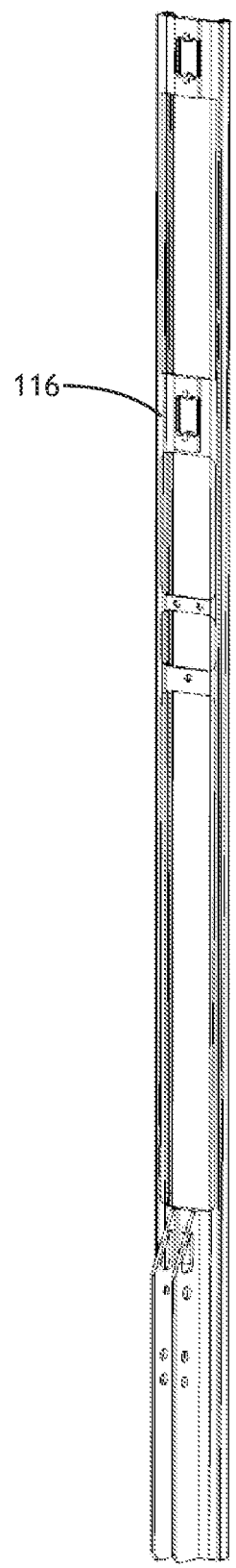
FIG. 6 is an isometric view of a motion sled in accordance with an embodiment of this disclosure.

FIGS. 5 and 6 illustrate non-limiting examples of respective stanchion 112 and motion sled 116 extrusions showing their relatively long lengths.

Figure 7:
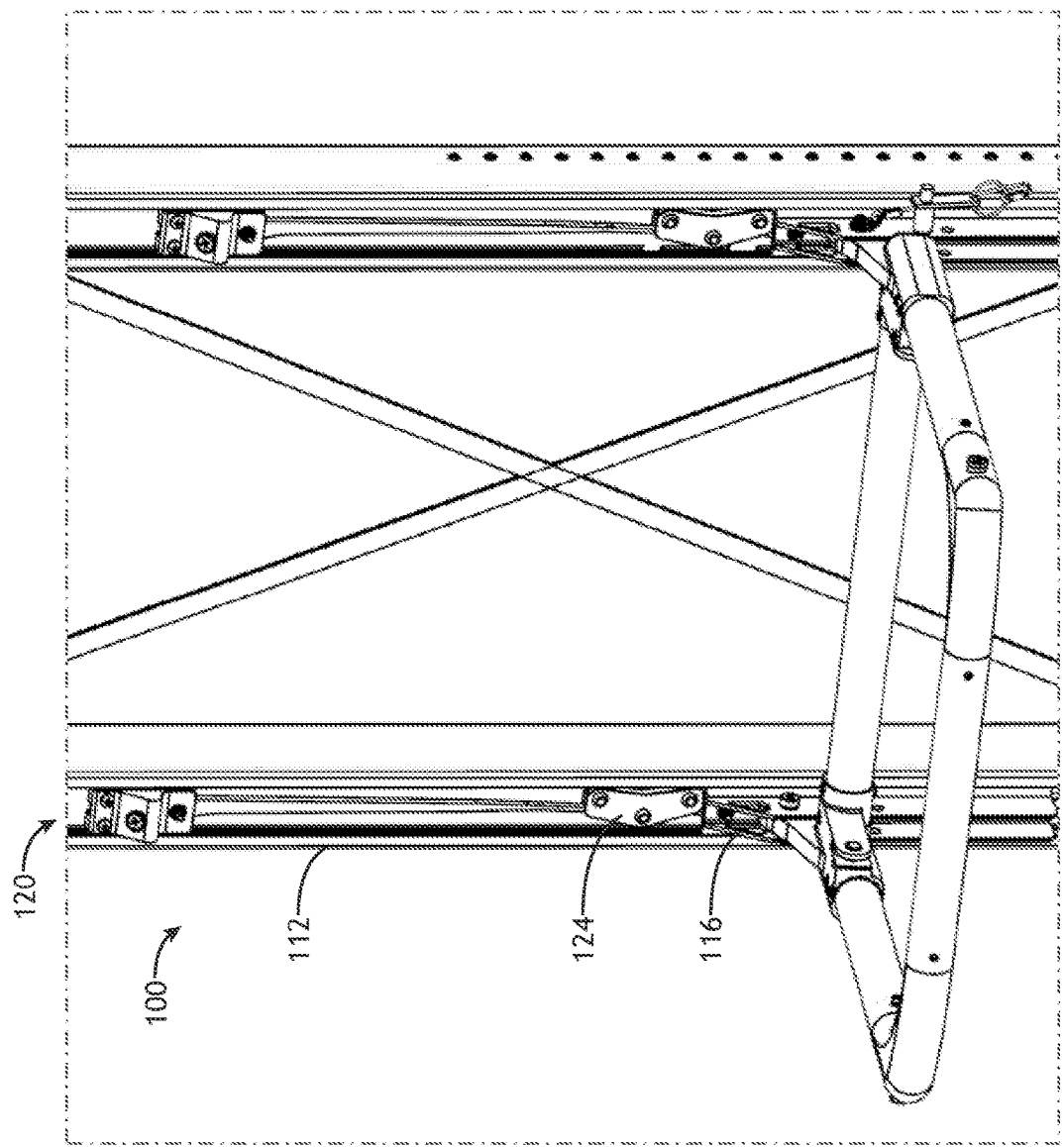
FIG. 7 is a detailed view of a symmetrical stanchion assembly configuration of the aircraft seat in accordance with an embodiment of this disclosure.
Figure 8:
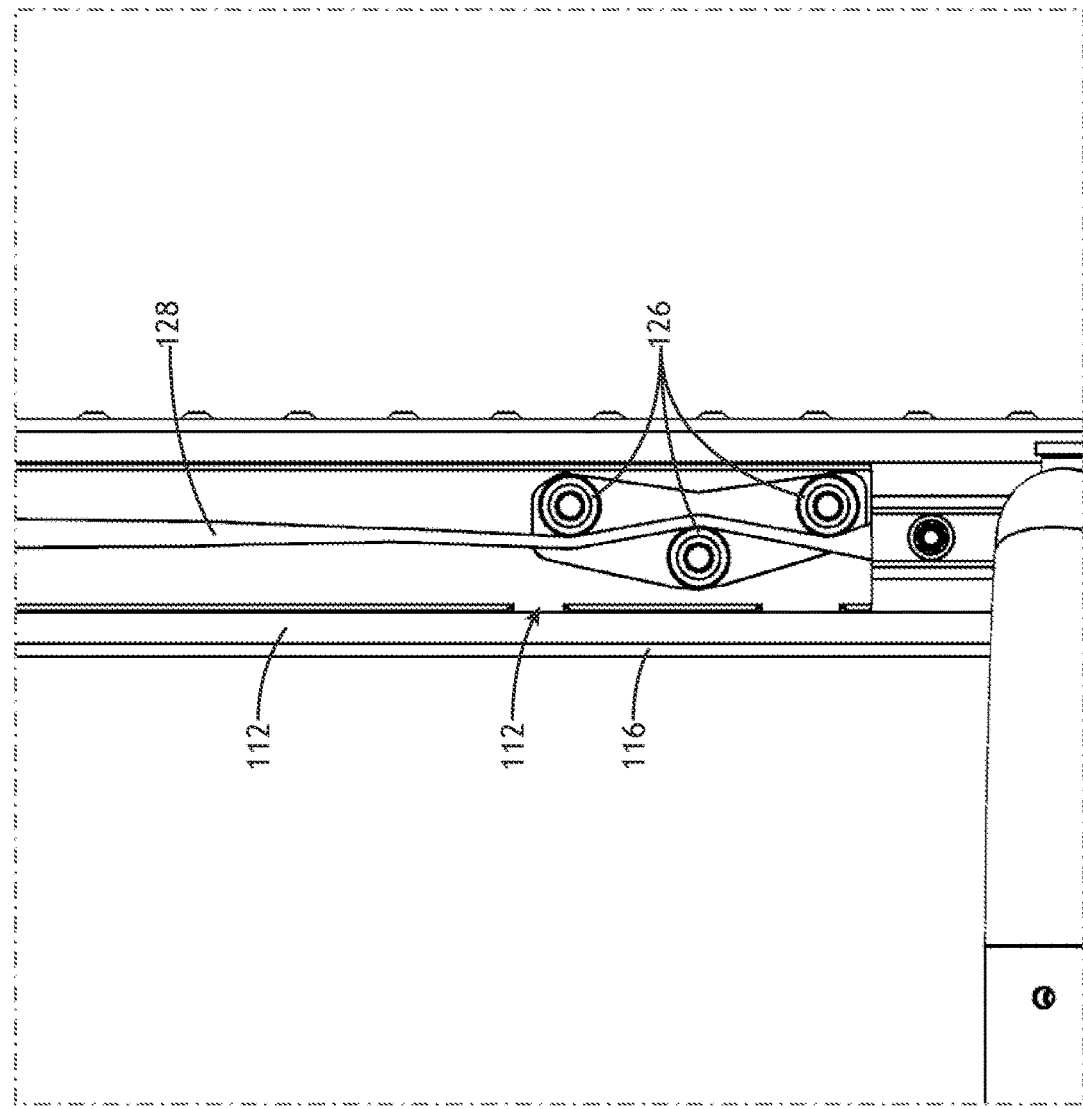
FIG. 8 is a detailed view of a wire bender energy absorber system of the aircraft seat in accordance with an embodiment of this disclosure.

FIGS. 7 and 8 illustrates the portion of the seat assembly 100 including the energy absorbers 124. Each stanchion assembly includes a motion sled 116 and an energy absorber 124, preferably in a symmetrical arrangement to prevent binding during stroking. In some embodiments, each energy absorber 124 is a wire bender system including a plurality of rollers 126 affixed to the stanchion 112 and positioned in the elongated guide channel 120. A wire 128 is affixed at its lower end to the motion sled 116 and at its upper end my rest in a guide space such that when wire deformation occurs the upper end is kept from straying too fat laterally due to distortion of the wire downstream at the rollers causing movement at the upper end of the wire. The wire 128, proximate the bottom attached end, is threaded through the rollers 126 such that the wire is bent and unbent as the wire is pulled through the rollers.

In use, when the load on the seat bucket (corresponding to lumbar spine load on the occupant) exceeds the predetermined threshold load value, movement of the elongated motion sled 116 relative to the stanchion 112 occurs causing the wire 128 to be pulled through the plurality of rollers 126 thereby deforming the wire by bending the wire thereby attenuating energy. In some embodiments, the wire 128 increases in cross section toward a top end of the wire such that resistance to motion increases as the seat bucket strokes further downward relative to the stationary stanchions 116.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An aircraft seat assembly, comprising:
   a stanchion including an elongated guide channel;
   an elongated motion sled nested in the elongated guide channel;
   a seat bucket affixed to the elongated motion sled; and
   an energy absorber coupled between the stanchion and the elongated motion sled, the energy absorber configured to control motion of the elongated motion sled relative to the stanchion as the elongated motion sled strokes relative to the stanchion when a predetermined threshold load value is exceeded;
   wherein the energy absorber is a wire bender assembly comprising:
     a plurality of rollers affixed to the stanchion and positioned in the elongated guide channel; and
     a wire affixed to the elongated motion sled and engaging the plurality of rollers;
     wherein, when the predetermined threshold load value is exceeded, movement of the elongated motion sled relative to the stanchion causes the wire to be pulled through the plurality of rollers thereby deforming the wire by bending the wire thereby attenuating energy; and wherein the wire increases in cross section toward a top of the wire such that resistance increases with continued motion of the elongated motion sled relative to the stanchion.

2. The aircraft seat assembly according to claim 1, further comprising a low friction material positioned at an interface between the elongated motion sled and the stanchion, the low friction material having a lower coefficient of friction as compared to at least one of the elongated motion sled and the stanchion.

3. The aircraft seat assembly according to claim 1, wherein the guide channel has a C-shaped cross section opening in a first direction and the elongated motion sled has a C-shaped cross section opening in a second direction opposite the first direction.

4. The aircraft seat assembly according to claim 1, wherein the seat bucket is affixed to the elongated motion sled by at least three attachment points.

5. The aircraft seat assembly according to claim 1, comprising two stanchions symmetrically arranged, each of the two stanchions defining the elongated guide channel and having the elongated motion sled positioned therein and the energy absorber, and wherein the seat bucket is affixed to the two elongated motion sleds in a symmetrical arrangement.

6. The aircraft seat assembly according to claim 1, wherein the elongated guide channel and the elongated motion sled overlap a length of at least 24 inches.

7. An aircraft seat assembly, comprising:
a stanchion including an elongated guide channel;
an elongated motion sled nested in the elongated guide channel;
a seat bucket affixed to the elongated motion sled; and
an energy absorber coupled between the stanchion and the elongated motion sled, the energy absorber configured to control motion of the elongated motion sled relative to the stanchion as the elongated motion sled strokes relative to the stanchion when a predetermined threshold load value is exceeded;
wherein the guide channel has a C-shaped cross section opening in a first direction, and the elongated motion sled has a C-shaped cross section opening in a second direction opposite the first direction.

8. The aircraft seat assembly according to claim 7, further comprising a low friction material positioned at an interface between the elongated motion sled and the stanchion, the low friction material having a lower coefficient of friction as compared to at least one of the elongated motion sled and the stanchion.

9. The aircraft seat assembly according to claim 7, wherein the energy absorber is a wire bender assembly comprising:
a plurality of rollers affixed to the stanchion and positioned in the elongated guide channel; and
a wire affixed to the elongated motion sled and engaging the plurality of rollers;
wherein, when the predetermined threshold load value is exceeded, movement of the elongated motion sled relative to the stanchion causes the wire to be pulled through the plurality of rollers thereby deforming the wire by bending the wire thereby attenuating energy.

10. The aircraft seat assembly according to claim 9, wherein the wire increases in cross section toward a top of the wire such that resistance increases with continued motion of the elongated motion sled relative to the stanchion.

11. The aircraft seat assembly according to claim 7, wherein the seat bucket is affixed to the elongated motion sled by at least three attachment points.

12. The aircraft seat assembly according to claim 7, comprising two stanchions symmetrically arranged, each of the two stanchions defining the elongated guide channel and having the elongated motion sled positioned therein and the energy absorber, and wherein the seat bucket is affixed to the two elongated motion sleds in a symmetrical arrangement.

13. The aircraft seat assembly according to claim 7, wherein the elongated guide channel and the elongated motion sled overlap a length of at least 24 inches.

14. An aircraft seat assembly, comprising:
a stanchion including an elongated guide channel;
an elongated motion sled nested in the elongated guide channel;
a seat bucket affixed to the elongated motion sled; and
an energy absorber coupled between the stanchion and the elongated motion sled, the energy absorber configured to control motion of the elongated motion sled relative to the stanchion as the elongated motion sled strokes relative to the stanchion when a predetermined threshold load value is exceeded;
wherein the elongated guide channel and the elongated motion sled overlap a length of at least 24 inches.

15. The aircraft seat assembly according to claim 14, further comprising a low friction material positioned at an interface between the elongated motion sled and the stanchion, the low friction material having a lower coefficient of friction as compared to at least one of the elongated motion sled and the stanchion.

16. The aircraft seat assembly according to claim 14, wherein the energy absorber is a wire bender assembly comprising:
a plurality of rollers affixed to the stanchion and positioned in the elongated guide channel; and
a wire affixed to the elongated motion sled and engaging the plurality of rollers;
wherein, when the predetermined threshold load value is exceeded, movement of the elongated motion sled relative to the stanchion causes the wire to be pulled through the plurality of rollers thereby deforming the wire by bending the wire thereby attenuating energy.

17. The aircraft seat assembly according to claim 16, wherein the wire increases in cross section toward a top of the wire such that resistance increases with continued motion of the elongated motion sled relative to the stanchion.

18. The aircraft seat assembly according to claim 14, wherein the guide channel has a C-shaped cross section opening in a first direction and the elongated motion sled has a C-shaped cross section opening in a second direction opposite the first direction.

19. The aircraft seat assembly according to claim 14, wherein the seat bucket is affixed to the elongated motion sled by at least three attachment points.

20. The aircraft seat assembly according to claim 14, comprising two stanchions symmetrically arranged, each of the two stanchions defining the elongated guide channel and having the elongated motion sled positioned therein and the energy absorber, and wherein the seat bucket is affixed to the two elongated motion sleds in a symmetrical arrangement.

* * * * *